(12) United States Patent
Wei

(10) Patent No.: US 12,140,354 B2
(45) Date of Patent: Nov. 12, 2024

(54) ELECTRONIC EXPANSION VALVE

(71) Applicant: ZHEJIANG SANHUA INTELLIGENT CONTROLS CO., LTD., Zhejiang (CN)

(72) Inventor: Xianrang Wei, Zhejiang (CN)

(73) Assignee: ZHEJIANG SANHUA INTELLIGENT CONTROLS, CO., LTD, Zhejiang (CN)

( * ) Notice: Subject to any disclaimer, the term of this patent is extended or adjusted under 35 U.S.C. 154(b) by 329 days.

(21) Appl. No.: 17/439,452

(22) PCT Filed: Jun. 28, 2020

(86) PCT No.: PCT/CN2020/098381
§ 371 (c)(1),
(2) Date: Sep. 15, 2021

(87) PCT Pub. No.: WO2020/259657
PCT Pub. Date: Dec. 30, 2020

(65) Prior Publication Data
US 2022/0154984 A1 May 19, 2022

(30) Foreign Application Priority Data
Jun. 28, 2019 (CN) .......................... 201910575526.5

(51) Int. Cl.
*F25B 41/35* (2021.01)
(52) U.S. Cl.
CPC .................................. *F25B 41/35* (2021.01)
(58) Field of Classification Search
CPC ... F25B 41/35; F16K 1/48; F16K 1/54; F16K 1/02; F16K 1/38; F16K 31/047; F16K 31/50; Y02B 30/70
See application file for complete search history.

(56) References Cited

U.S. PATENT DOCUMENTS 6,220,571 B1 * 4/2001 Kim ...................... F16K 31/047
251/903
6,561,480 B1 * 5/2003 Komiya ................ F25B 41/347
251/129.05

(Continued)

FOREIGN PATENT DOCUMENTS

CN 105626876 A 6/2016
CN 205745625 U 11/2016

(Continued)

OTHER PUBLICATIONS

Japanese Office Action dated Sep. 30, 2022 for Japanese Appl. No. 2021-556963.

(Continued)

*Primary Examiner* — Patrick C Williams
(74) *Attorney, Agent, or Firm* — Ohlandt, Greeley and Perle, L.L.P.

(57) ABSTRACT

An electronic expansion valve includes a valve needle lead screw assembly, the valve needle lead screw assembly including a gasket portion, a spring and a lead screw assembly; the lead screw assembly includes a lead screw, the spring is sleeved outside the lead screw; the lead screw assembly includes a lower stop portion and an upper stop portion, the lower stop portion includes a lower flange portion or a main body portion, and the lower stop portion or the main body portion (1562) can abut against the gasket portion. The upper stop portion includes an upper flange portion and/or an upper stop ring, and the upper flange portion and/or the upper stop ring abut against the spring; a lower end of the spring abuts against the gasket portion.

10 Claims, 16 Drawing Sheets

(56) References Cited

U.S. PATENT DOCUMENTS

| | | | |
|---|---|---|---|
| 8,651,456 B2 | 2/2014 | Zhan et al. | |
| 2009/0293519 A1 | 12/2009 | Hayashi | |
| 2010/0181514 A1* | 7/2010 | Ohuchi | ................ F16K 31/047 |
| | | | 251/284 |
| 2015/0184768 A1* | 7/2015 | Zhan | ....................... F25B 41/35 |
| | | | 251/65 |

FOREIGN PATENT DOCUMENTS

| | | | |
|---|---|---|---|
| CN | 107304843 A | 10/2017 | |
| CN | 107356025 A | 11/2017 | |
| CN | 206861006 U | 1/2018 | |
| CN | 108317259 A * | 7/2018 | .............. F16K 1/32 |
| CN | 108361385 A | 8/2018 | |
| CN | 109425150 A | 3/2019 | |
| CN | 209026210 U | 6/2019 | |
| EP | 3135969 A1 | 3/2017 | |
| JP | 2007292336 A | 11/2007 | |
| JP | 2009287913 A | 12/2009 | |
| JP | 2016205463 A | 12/2016 | |
| WO | WO-2006064865 A1 * | 6/2006 | .......... F16K 31/047 |
| WO | 2018133673 A1 | 7/2018 | |
| WO | 20180137636 A1 | 8/2018 | |

OTHER PUBLICATIONS

Indian Office Action dated Jul. 4, 2022 for Indian Appl. No. 202117041419.
Extended European Search Report dated Jun. 19, 2023 for European Appl. No. 20832134.9.
International Search Report dated Sep. 28, 2020 for PCT Appl. No. PCT/CN2020/098381.

* cited by examiner

US 12,140,354 B2

ELECTRONIC EXPANSION VALVE

The present application is a National Phase entry of PCT Application No. PCT/CN2020/098381, filed on Jun. 28, 2020, which claims the priority to Chinese Patent Application No. 201910575526.5, titled "ELECTRONIC EXPANSION VALVE", filed with the China National Intellectual Property Administration on Jun. 28, 2019, the entire disclosures of which are incorporated herein by reference.

FIELD

The present application relates to the technical field of refrigeration control, and particularly to an electronic expansion valve.

BACKGROUND

FIG. 1 shows a typical valve needle assembly structure of an electronic expansion valve. The valve needle assembly of the electronic expansion valve has a screw rod 16', and the screw rod 16' and the valve needle 5' realize a floating connection through a sleeve 25'; a gasket 27' is arranged between the valve needle 5' and the sleeve 25'. A compression spring 8' is mounted in the sleeve 25'. An upper end of the compression spring 8' abuts against the bushing at a lower end of the screw rod 16'. A lower end surface of the compression spring 8' abuts against the bearing 24'.

Those skilled in the art may provide another valve needle screw rod assembly, and the spring of the valve needle screw rod assembly is not easy to deflect.

SUMMARY

An object of the present application is to provide an electronic expansion valve, and the spring of the valve needle screw rod assembly is not easy to deflect.

In order to achieve the above object, the following technical solutions are adopted: an electronic expansion valve, including a valve needle screw rod assembly; the valve needle screw rod assembly includes a washer portion, a spring, and a screw rod assembly; the screw rod assembly includes a screw rod, and the spring is mounted around the screw rod;

the screw rod assembly includes a lower stop portion and an upper stop portion, the lower stop portion includes a lower flange portion or a body portion, the lower stop portion or the body portion may abut against the washer portion.
the upper stop portion includes an upper flange portion and/or an upper retaining ring, the upper flange portion and/or the upper retaining ring abuts against the spring;
the lower end of the spring abuts against the washer portion.

In the electronic expansion valve provided by the present application, the spring is mounted around the screw rod, and the upper end of the spring abuts against the upper stop portion, the lower end of the spring abuts against the lower stop portion, the spring is matched with the screw rod assembly, and the spring of the valve needle screw rod assembly is not easy to deflect.

Figure 1:
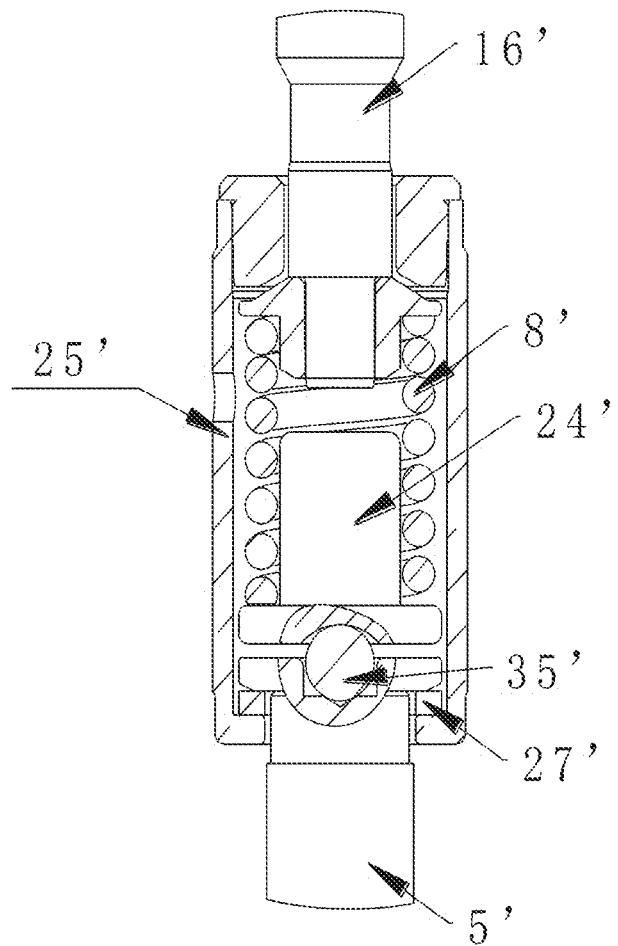
FIG. 1 shows a typical valve needle assembly structure of an electronic expansion valve.

The above drawings include the following reference numerals:

1 valve needle screw rod assembly; 11 valve needle; 111 valve needle sealing portion; 12 valve needle sleeve; 121 matching portion; 122 peripheral wall portion; 13 washer portion; 14 spring; 15 screw rod assembly; 151 screw rod; 1511 lower groove portion of spring; 1512 valve needle support groove portion; 1513 valve needle support flange portion; 1514 annular groove above spring; 153 lower stop portion; 1531 lower flange portion; 154 valve needle support portion; 1541 valve needle support washer; 155 upper stop portion; 1551 upper flange portion; 1552 upper retaining ring; 156 bushing part; 1561 connecting hole portion; 1562 body portion; 1563 suspension engagement portion; 20 valve body; 2 valve seat assembly; 21 valve seat; 211 valve port; 2111 valve port sealing portion; 212 inner hole guide portion; 22 first connecting pipe portion; 23 second connecting pipe portion; 24 guide seat; 241 inner hole guiding portion; 25 connecting seat; 3 nut assembly; 31 nut; 32 nut connection portion; 33 slip ring; 4 rotor assembly; 41 rotor magnet; 42 rotor connecting portion; 43 rotor stop portion; 5 outer shell; 30 stator coil.

DETAILED DESCRIPTION OF THE EMBODIMENTS

In order to provide those skilled in the art a better understanding of the solutions of the present application, the present application is described hereinafter in further detail in conjunction with the drawings and embodiments.

Figure 2:
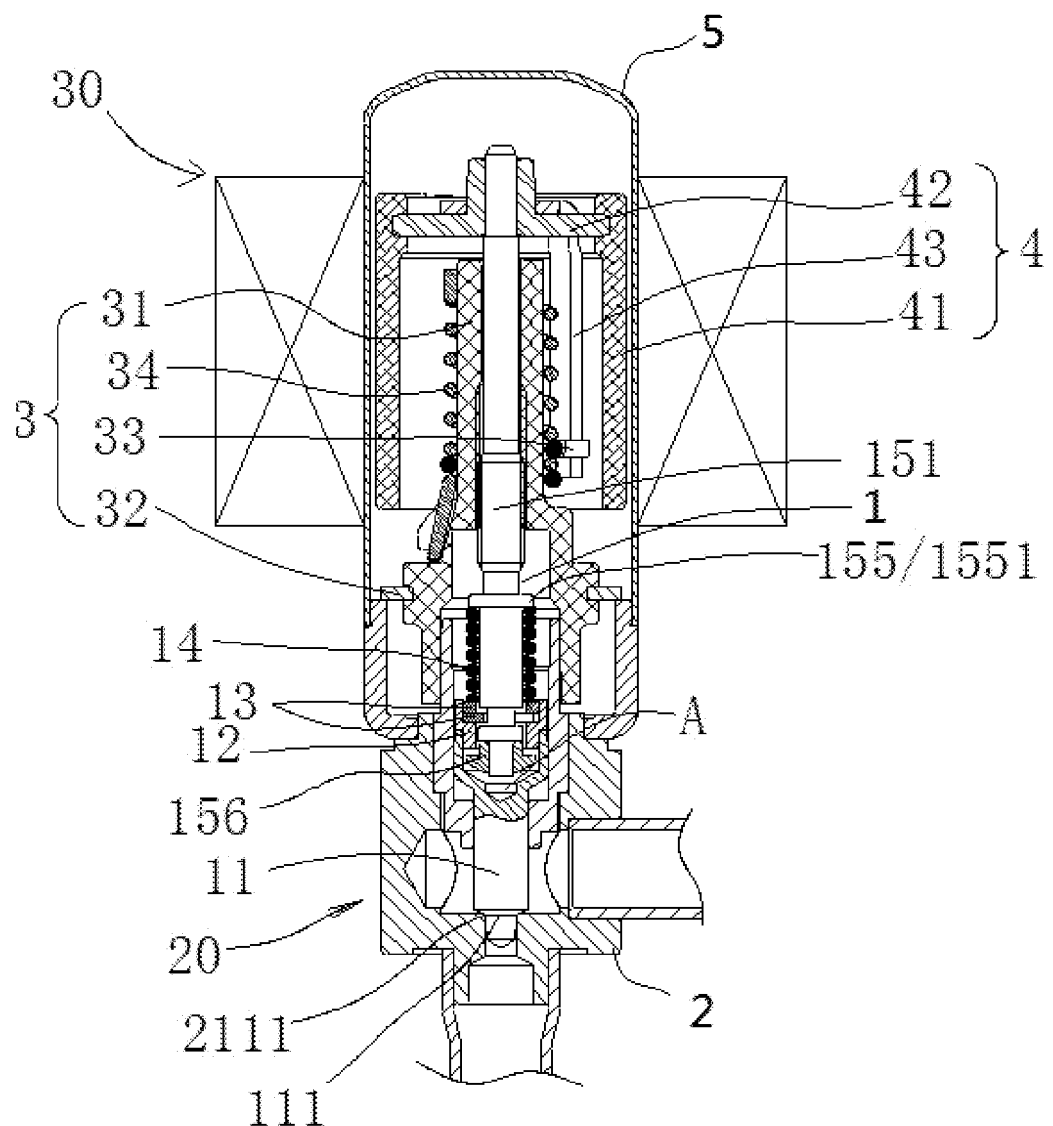
FIG. 2 is a cross-sectional view of the first embodiment of the electronic expansion valve provided by the present application in a fully closed state.
Figure 3:
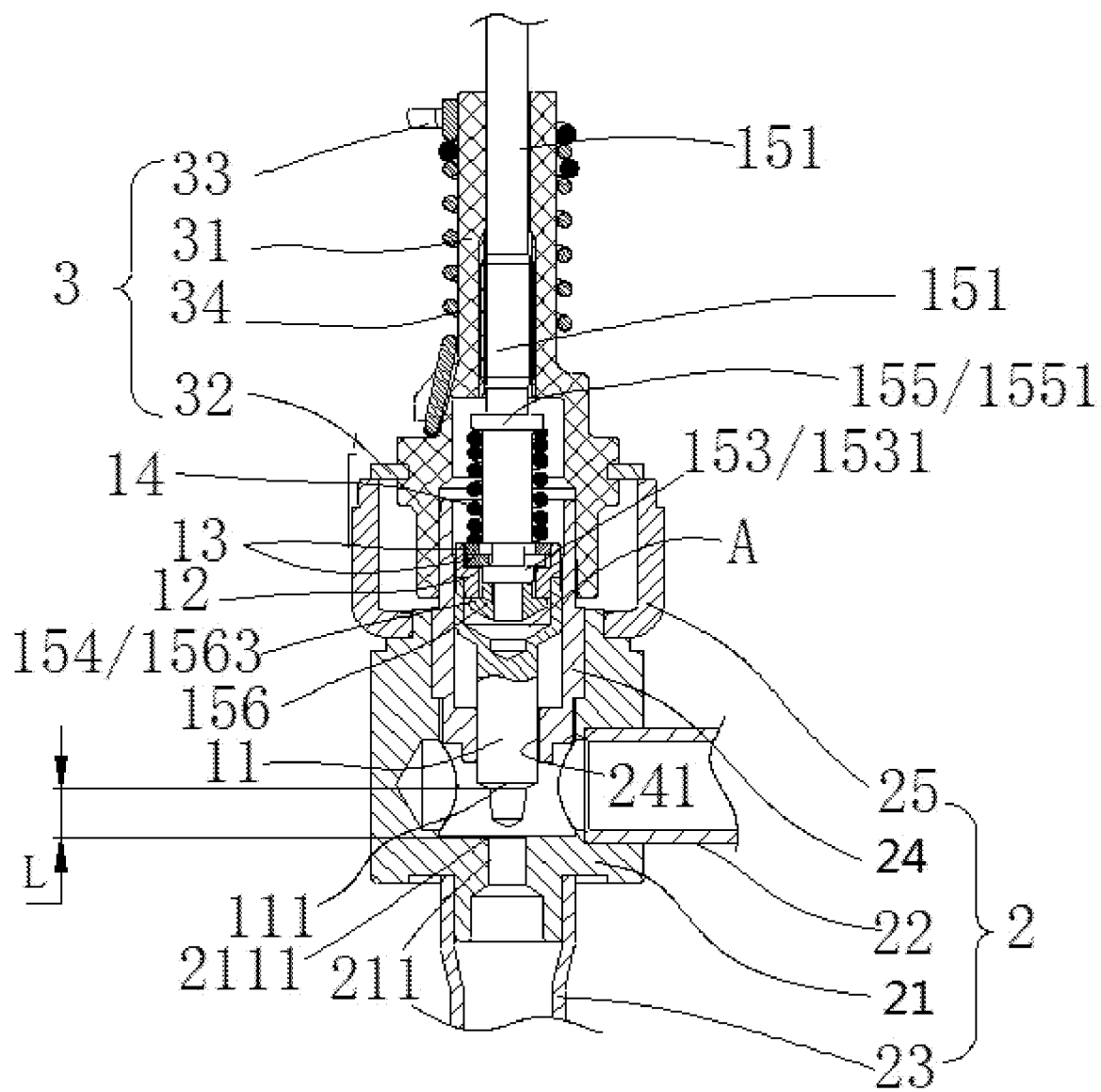
FIG. 3 is a partial cross-sectional view of the first embodiment of the electronic expansion valve provided by the present application in a fully open state.
Figure 4:
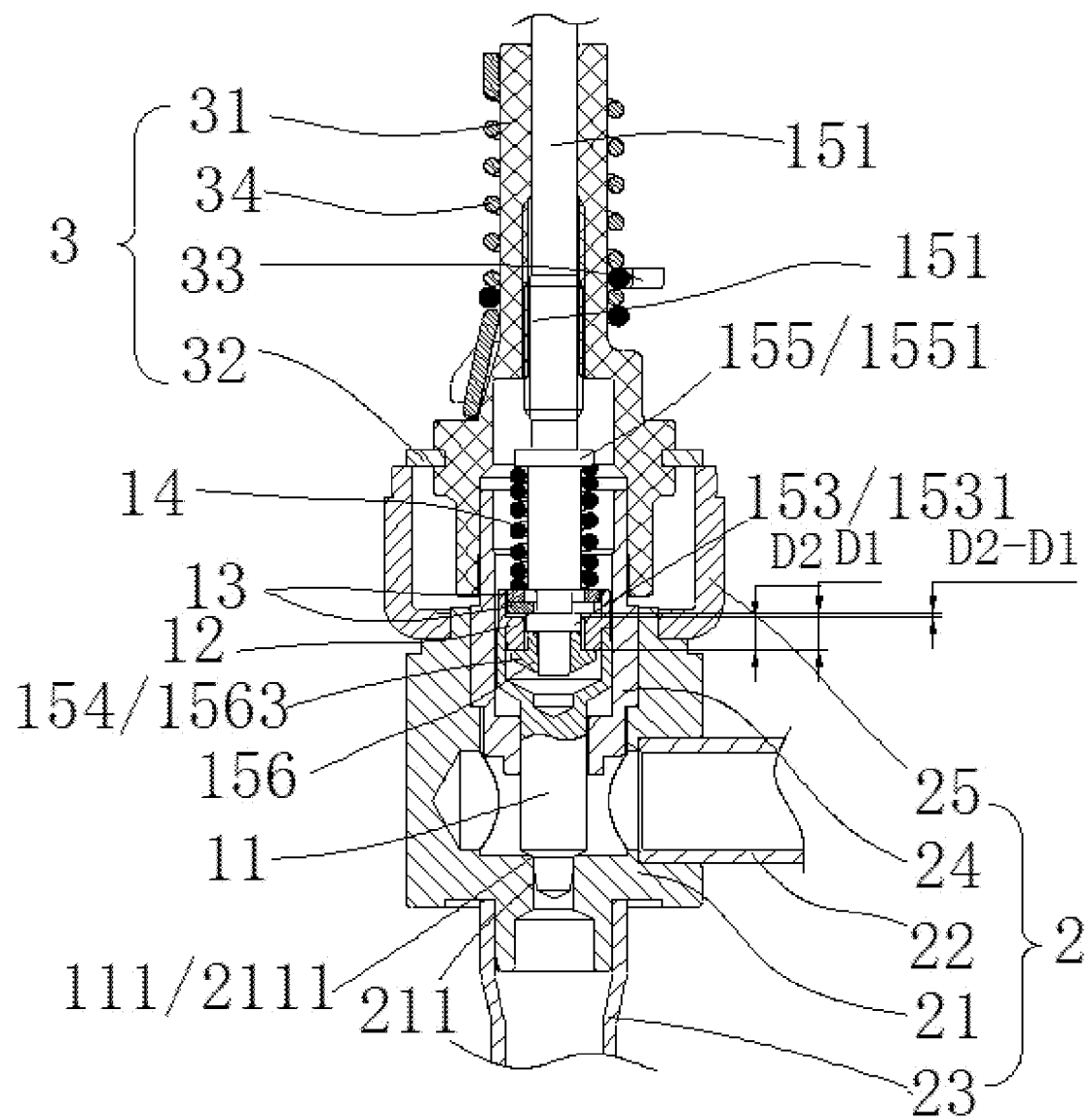
FIG. 4 is a partial cross-sectional view of the first embodiment of the electronic expansion valve provided by the present application when the valve needle and the valve port sealing portion just contact.
Figure 5:
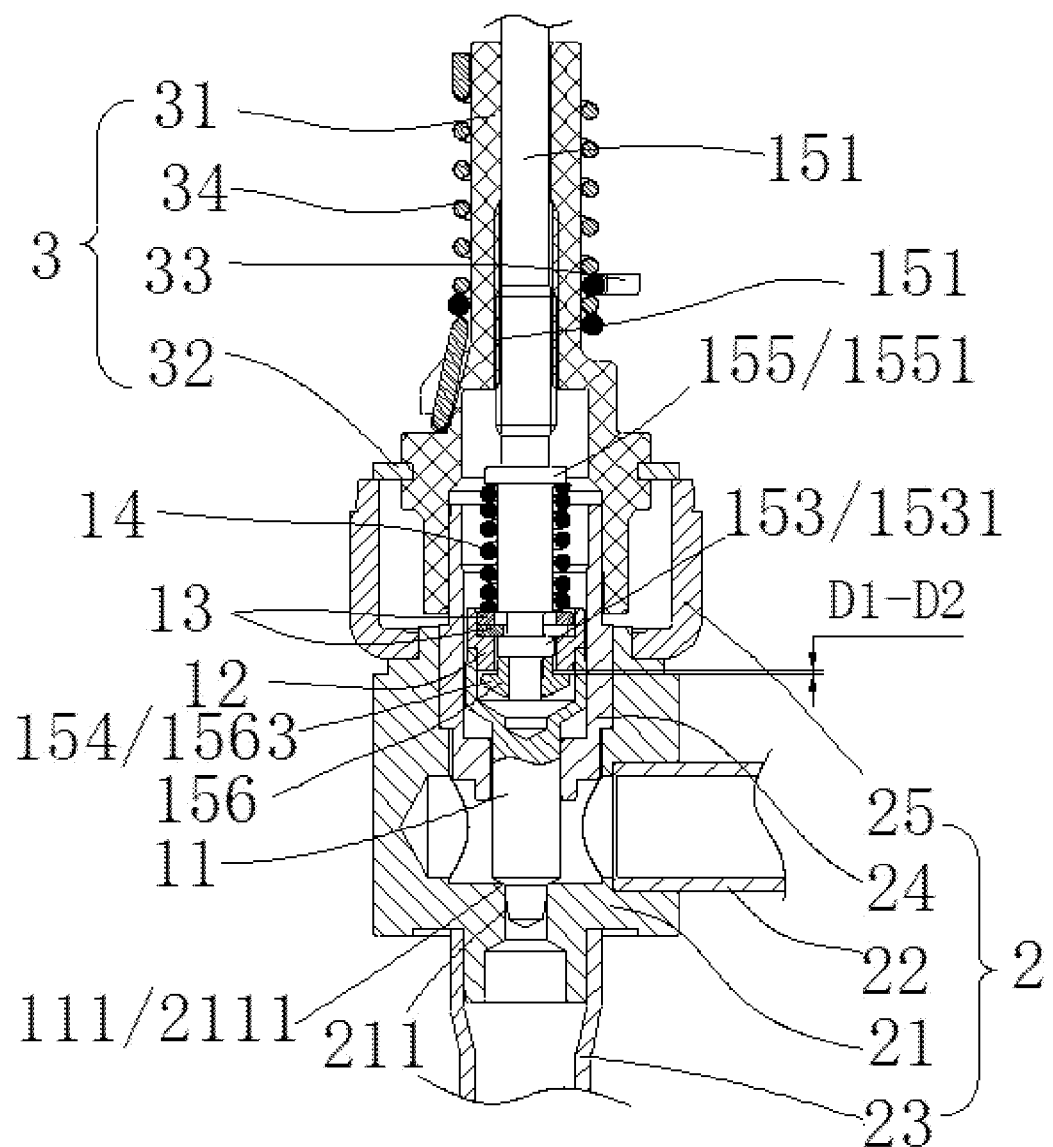
FIG. 5 is a partial cross-sectional view of the first embodiment of the electronic expansion valve provided by the present application when the spring has not been further compressed at the critical point.
Figure 6:
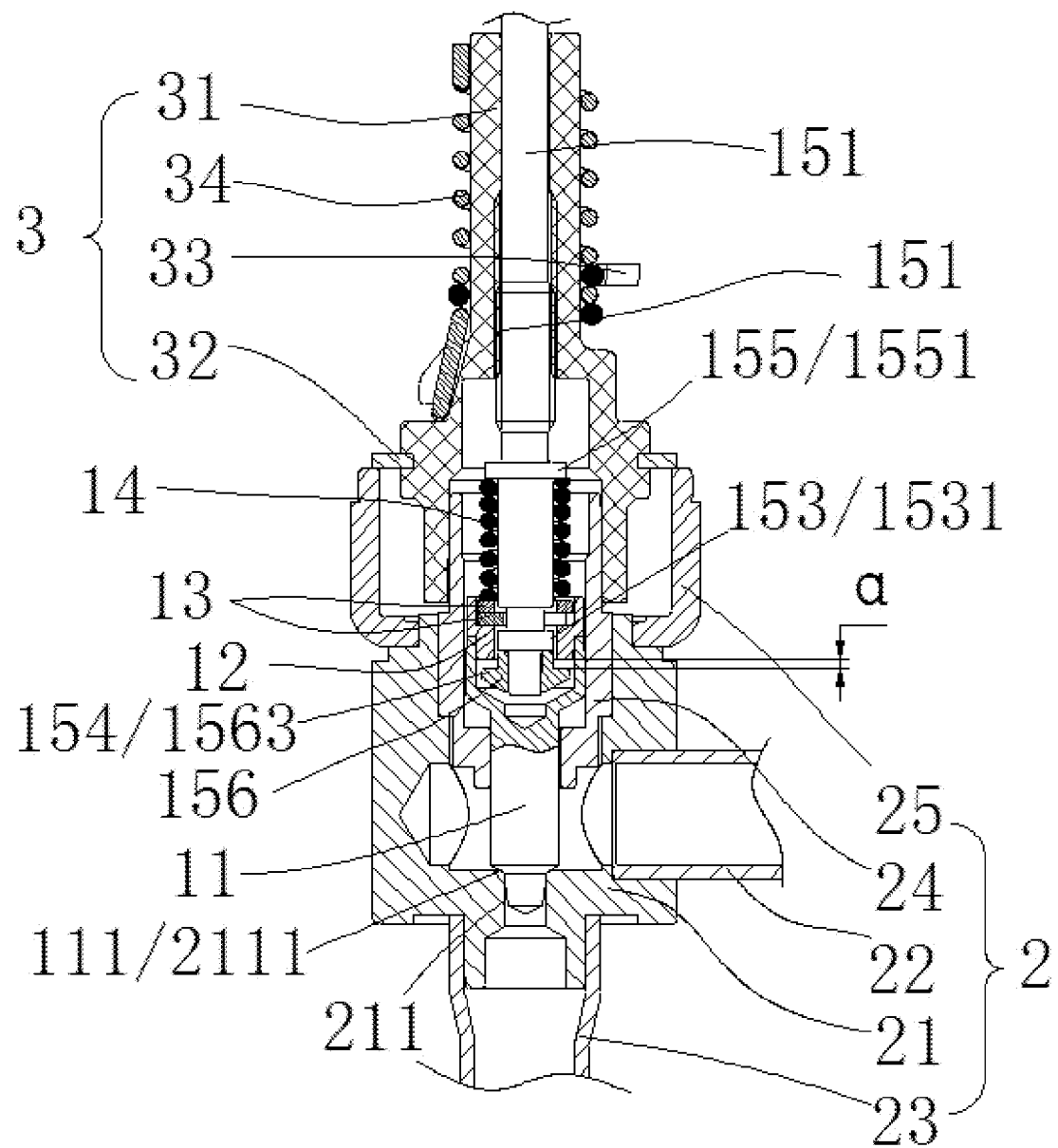
FIG. 6 is a partial cross-sectional view of the first embodiment of the electronic expansion valve provided by the present application in a fully closed state.
Figure 7:
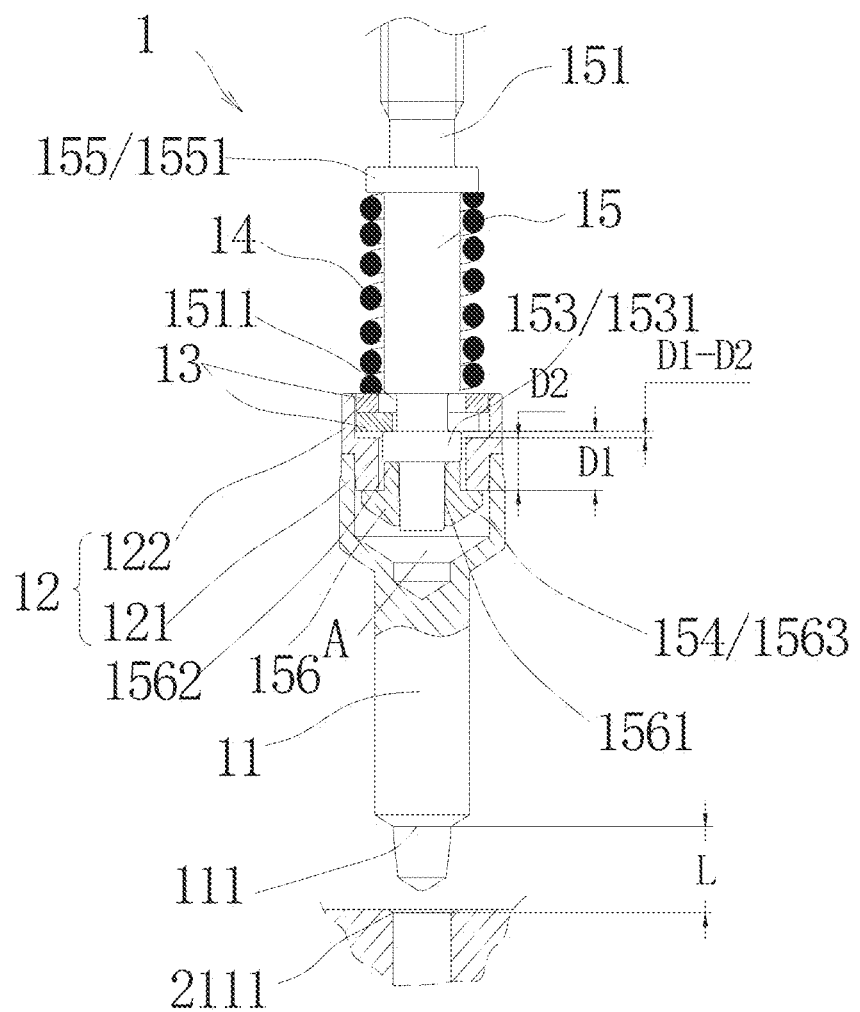
FIG. 7 is a cross-sectional view of the valve needle screw rod assembly in FIG. 2.
Figure 8:
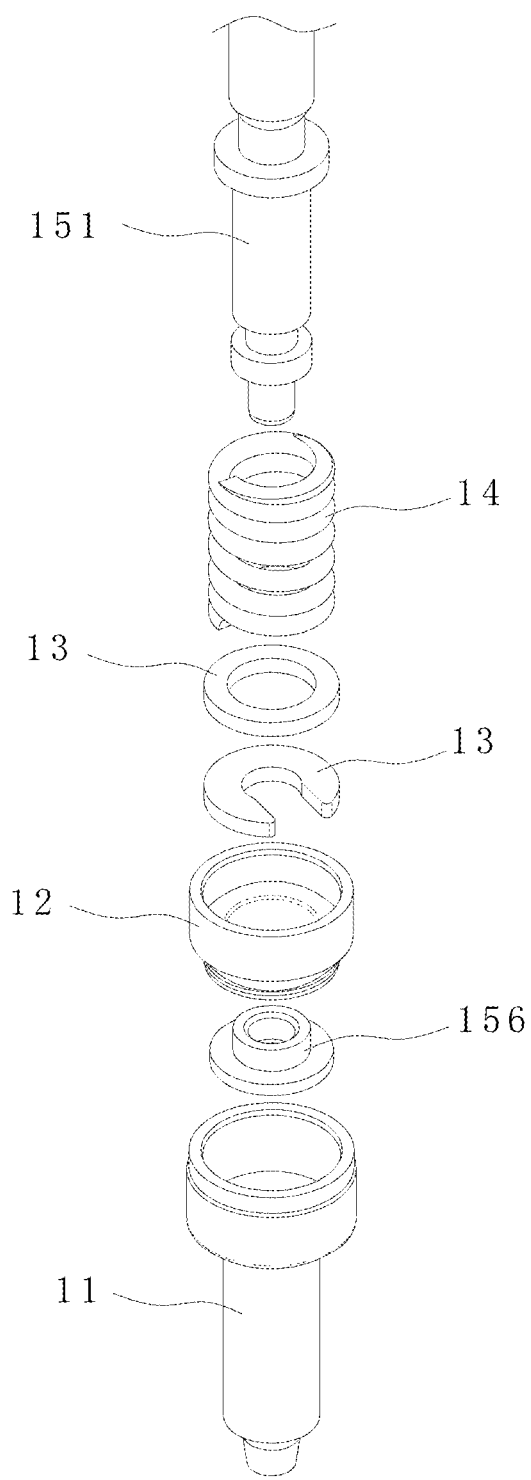
FIG. 8 is an exploded view of the valve needle screw rod assembly in FIG. 7.

Referring to FIG. 2 to FIG. 8, FIG. 2 is a cross-sectional view of the first embodiment of the electronic expansion valve provided by the present application in a fully closed state; FIG. 3 is a partial cross-sectional view of the first embodiment of the electronic expansion valve provided by the present application in a fully open state; FIG. 4 is a partial cross-sectional view of the first embodiment of the electronic expansion valve provided by the present application when the valve needle and the valve port sealing portion just contact; FIG. 5 is a partial cross-sectional view of the first embodiment of the electronic expansion valve provided by the present application when the spring has not been further compressed at the critical point; FIG. 6 is a partial cross-sectional view of the first embodiment of the electronic expansion valve provided by the present application in a fully closed state; FIG. 7 is a cross-sectional view of the valve needle screw rod assembly in FIG. 2; FIG. 8 is an exploded view of the valve needle screw rod assembly in FIG. 7.

With specific reference to FIG. 2, FIG. 2 is a cross-sectional view of the first embodiment of the electronic expansion valve provided by the present application in a fully closed state. In a specific embodiment, the electronic expansion valve provided by the present application comprises a valve body 20 and a stator coil 30. The valve body 20 includes a valve needle screw rod assembly 1, a valve seat assembly 2, a nut assembly 3, a rotor assembly 4 and an outer shell 5. The stator coil 30 of the electronic expansion valve is connected to the drive controller. After the drive controller is energized, a pulse drive signal is sent to the stator coil 30. The stator coil 30 generates a periodically changing magnetic field, thereby driving the rotor assembly 4 of the electronic expansion valve to rotate in a forward direction or a reverse direction. The rotor assembly 4 is fixedly connected with the screw rod 151 of the valve needle screw rod assembly 1. When the rotor assembly 4 rotates, it synchronously drives the screw rod 151 to rotate. The screw rod 151 of the valve needle screw rod assembly 1 is provided with an external thread, and an inner hole of the nut 31 of the nut assembly 3 is provided with an internal thread. The screw rod 151 is threadedly engaged with the nut 31. When the rotor assembly 4 rotates, the screw rod 151 moves along the axial direction, thus driving the valve needle screw rod assembly 1 to move towards or far away from the valve port 211.

Referring to FIG. 2, the valve seat assembly 2 provided in this embodiment includes a valve seat 21, a first connecting pipe portion 22, a second connecting pipe portion 23, a guide seat 24 and a connecting seat 25. The first connecting pipe portion 22, the second connecting pipe portion 23, the guide seat 24 and the connecting seat 25 are fixedly assembled with the valve seat 21. The first connecting pipe portion 22 and the second connecting pipe portion 23 serve as a inflow or outflow channel of the fluid medium of the electronic expansion valve, and are generally used for connecting with the system pipeline when the electronic expansion valve is mounted in a refrigeration or heating system such as an air conditioner. The valve seat 21 is provided with a valve port 211 at a position close to the center of the second connecting pipe portion 23, and a valve port sealing portion 2111 is provided on an upper edge of the valve port 211.

A center inner hole position of the guide seat 24 of the valve seat assembly 2 is provided with an inner hole guiding portion 241 that matches with an outer wall of the valve needle screw rod assembly. When the electronic expansion valve is opened or closed, the inner hole guiding portion 241 provides a guiding function for the valve needle screw rod assembly.

An upper side of the valve seat assembly 2 is coaxially provided with a nut assembly 3. The nut assembly 3 includes a nut 31, a nut connection portion 32, a slip ring 33 and a spiral guide 34. The nut 31 may be fixedly connected to the valve seat assembly 2 through the nut connection portion 32 by welding or the like. On an outer circle of the nut 31 on the upper side, a slip ring 33 and a spiral guide 34 are provided. The slip ring 33 may spirally rotate along the spiral guide 34 within the upper and lower stroke limits. The slip ring 33 and the spiral guide 34 cooperate with the rotor assembly 4 to realize the stroke control of the electronic expansion valve from fully opening to fully closing.

Referring to FIG. 2, the rotor assembly 4 includes a rotor magnet 41, a rotor connecting portion 42, and a rotor stop portion 43 (the rotor stop portion 43 and the rotor magnet 41 may be integrally formed. In this embodiment, a separate assembly method is adopted). The rotor assembly 4 may be fixedly connected to the screw rod 151 of the valve needle screw rod assembly 1 through the rotor connecting portion 42 (for example, welding connection may be adopted), the rotor assembly 4 is driven by the stator coil 30 to drive the screw rod 151 to rotate synchronously. A rotor stop portion 43 is provided inside the rotor assembly 4. The rotor stop portion 43 cooperates with the slip ring 33 on the nut 31 and the spiral guide 34 to limit the rotation of the rotor assembly 4 within a prescribed stroke range.

In addition, the electronic expansion valve provided in this embodiment further includes the outer shell 5 with an open end, the outer shell 5 is mounted outside the rotor assembly 4. The opening of the outer shell 5 and the connecting seat 25 on the upper side of the valve seat assembly 2 are welded and sealed to form a closed accommodating cavity.

The valve needle screw rod assembly 1 mainly includes a valve needle 11, a valve needle sleeve 12, a washer portion 13, a spring 14 and a screw rod assembly 15. Specifically, referring to FIG. 7 and FIG. 8, FIG. 7 is a cross-sectional view of the valve needle screw rod assembly; FIG. 8 is an exploded view of the valve needle screw rod assembly.

The valve needle 11 and the valve needle sleeve 12 may be fixedly connected by welding, etc. One end of the valve needle 11 includes a valve needle sealing portion 111, the valve needle sealing portion 111 is used for cooperating with the valve port sealing portion 2111 to close the valve port 211. The valve needle sleeve 12 includes a peripheral wall portion 122 located on its outer periphery and a matching portion 121 integrally formed with the peripheral wall portion 122. Of course, the peripheral wall portion 122 and the matching portion 121 may also be fixedly connected by welding, clamping, etc. In addition, an inner diameter of the peripheral wall portion 122 is larger than an inner diameter of the matching portion 121. The valve needle 11 and the valve needle sleeve 12 form an accommodating cavity A after being fixedly connected. Therefore, the valve needle 11 and the valve needle sleeve 12 define the accommodating cavity A.

The washer portion 13 provided in this embodiment may adopt a combination of an open retaining ring and a washer. That is, in this embodiment, the washer portion 13 includes both an open retaining ring and a washer. Of course, starting from the functional principle of the present application, the opening retaining ring of the washer portion 13 in this embodiment is not limited to the C-shaped opening retaining ring shown in the figure, and other shapes of opening retaining rings may also be used instead; Similarly, the washer in this embodiment is not limited to the circular ring-shaped washer in the figure, and may also be replaced by other retaining rings that play the same role, for example, an open retaining ring may also be used instead.

In this embodiment, when the valve needle sleeve 12, fixedly connected to the valve needle 11, and the screw rod 151 rotate relative to each other, their rotational friction fit surfaces are mainly the upper and lower surfaces of the opening retaining ring, or the upper and lower surfaces of the washer. In order to further reduce the frictional resistance of its relative rotation, it is preferable to spray or plate a coating with lubricating and wear-resistant functions on its surface (for example, a coating containing polytetrafluoroethylene, or containing graphite, or containing molybdenum disulfide), thereby increasing the service life of the electronic expansion valve.

The screw rod assembly 15 includes a lower stop portion 153, and the lower stop portion 153 abuts against the washer portion 13. Specifically, in this embodiment, the screw rod 151 includes a lower groove portion of spring 1511, and the lower groove portion of spring 1511 is formed by the recessing of the surface of the screw rod 151. The screw rod assembly 15 forms a lower flange portion 1531. In this embodiment, the lower stop portion 153 is a lower flange portion 1531.

In the lower groove portion of spring 1511, a washer portion 13 is provided. The washer portion 13 is connected with the lower groove portion of spring 1511 and the position thereof is limited.

It is worth noting that the lower flange portion 1531 may also be formed in different ways. For example, the screw rod 151 does not include the lower groove portion of spring 1511, and the lower flange portion 1531 may be formed by the lower end of the screw rod 151 extending in the circumferential direction of the surface thereof. The lower flange portion 1531 may still abut against the washer portion 13.

In addition, the screw rod assembly 15 further includes an upper stop portion 155, and the upper stop portion 155 abuts against the spring 14. Specifically, in this embodiment, the screw rod assembly 15 includes an upper flange portion 1551, and the upper flange portion 1551 extends circumferentially along the surface of the screw rod 151. The upper flange portion 1551 and the screw rod 151 may be integrally formed, or they may be fixedly connected by welding, etc. In this embodiment, the upper stop portion 155 is an upper flange portion 1551.

In addition, the spring 14 is further mounted around the screw rod 151. Specifically, one end of the spring 14 abuts against the upper flange portion 1551, and another end of the spring 14 abuts against the washer portion 13. Under the action of the spring 14, the washer portion 13 abuts the lower flange portion 1531. It is worth noting that one end of the spring 14 abuts against the upper flange portion 1551, which means that one end of the spring 14 may directly abut against the upper flange portion 1551, and one end of the spring 14 may indirectly abutting against the upper flange portion 1551, for example, the spring 14 and the upper flange portion 1551 are directly provided with a retaining ring or other components.

Since the washer portion 13 is connected with the lower groove portion of spring 1511 and the position thereof is limited, the washer portion 13 abuts against the lower flange portion 1531 due to the influence of the spring 14 on the washer portion 13.

In the electronic expansion valve provided in this embodiment, the spring 14 is mounted around the screw rod 151, and the upper end of the spring 14 abuts against the upper stop portion 155 by the washer portion 13, and the lower end of the spring 14 abuts against the lower stop portion 153. The cooperation of the spring 14 and the screw rod assembly 15 may relatively reduce the deflection of the spring 14, thereby reducing eccentric wear.

In addition, the valve needle screw rod assembly 1 provided by this embodiment further includes a valve needle support portion 154, and the valve needle support portion 154 abuts against the matching portion 121. Specifically, in this embodiment, the screw rod assembly 15 includes a bushing part 156. The bushing part 156 includes a connecting hole portion 1561, a body portion 1562, and a suspension engagement portion 1563. The connecting hole portion 1561 may be a through hole or a blind hole, and one end of the screw rod 151 and the connecting hole portion 1561 may be fixedly connected by welding, interference fit, or the like.

The suspension engagement portion 1563 extends along the circumferential direction of the body portion 1562, and the outer diameter of the suspension engagement portion 1563 is larger than the outer diameter of the body portion 1562. In this embodiment, the valve needle support portion 154 is the suspension engagement portion 1563, and the outer diameter of the suspension engagement portion 1563 is larger than the inner diameter of the matching portion 121.

In addition, when the valve port is fully opened or the like, a distance D1 between the suspension engagement portion 1563 and the first retaining ring is larger than or equal to a distance D2 between the suspension engagement portion 1563 and the upper end of the matching portion 121.

At this time, the valve needle 11 may be suspended on the suspension engagement portion 1563 through the valve needle sleeve 12. Since the valve needle 11 is suspended on the suspension engagement portion 1563 through the valve needle sleeve 12, the valve needle 11 is not subjected to the elastic load generated by the spring 14.

Reference can be made to FIG. 3. FIG. 3 is a partial cross-sectional view of the first embodiment of the electronic expansion valve provided by the present application in a fully open state. When the electronic expansion valve is in the fully open state, the stroke of the valve needle 11 from the valve port 211 is L. At this time, the valve needle screw rod assembly 1 is at the uppermost end of its stroke, and the spring 14 is in its initial compression state. The slidable washer portion 13 provided on the valve needle screw rod assembly 1 abuts on the upper surface of the lower flange portion 1531, and the valve needle 11 is not subjected to the elastic load generated by the spring 14. The valve needle 11 is suspended on the suspension engagement portion 1563 through the valve needle sleeve 12. A lower surface of the washer portion 13 abuts against the upper surface of the lower flange portion 1531. At this time, there is still a certain amount of clearance D1−D2 between the lower surface of the washer portion 13 and the upper surface of the matching portion 121, so the valve needle is not subjected to the elastic load generated by the spring 14. The valve needle 11 is suspended and supported by the suspension engagement portion 1563 of the bushing part 156.

In addition, as the rotor assembly 4 rotates, the screw rod 151 may move along the axial direction, and the distance between the valve needle sealing portion 111 of the valve needle 11 and the valve port sealing portion 2111 of the valve port 211 may also change.

Reference can be made to FIG. 4. FIG. 4 is a partial cross-sectional view of the first embodiment of the electronic expansion valve provided by the present application when the valve needle and the valve port sealing portion just contact; the electronic expansion valve moves from the fully open state until the valve needle sealing portion 111 just touches the valve port sealing portion 2111. At this time, the displacement of the valve needle 11 is L, and the spring 14 is always in its initial compressed state. The lower stop portion 153 provided on the screw rod 151 always abuts against the lower flange portion 1531 of the screw rod assembly 15; the valve needle 11 is also not subjected to the elastic load generated by the compression spring 14 in this state, the lower surface of the washer portion 13 and the upper surface of the matching portion 121 of the valve needle sleeve 12 still maintain a certain amount of clearance D1−D2.

Reference can be made to FIG. 5. FIG. 5 is a partial cross-sectional view of the first embodiment of the electronic expansion valve provided by the present application when the spring has not been further compressed at the critical point. Compared with the state in FIG. 4, the screw rod 151 in FIG. 5 continues to move downward by the displacement amount of D1−D2. At this time, the lower surface of the washer portion 13 and the upper end of the matching portion 121 of the valve needle sleeve 12 are just at the critical point of contact, which is equivalent to the spring 14 being at the critical point to be further compressed, and is also equivalent to the valve needle 11 and the valve needle sleeve 12 being at the critical point to withstand the elastic load of the compression spring 14 that is further compressed.

Reference can be made to FIG. 6. FIG. 6 is a partial cross-sectional view of the first embodiment of the electronic expansion valve provided by the present application in a fully closed state. Compared with the state in FIG. 5, the screw rod 151 in FIG. 6 is moved downward by a displacement amount of a, the lower surface of the washer portion 13 and the matching portion 121 of the valve needle sleeve 12 have been pressed tightly, and the spring 14 has been further compressed. The valve needle sealing portion 111 of the valve needle screw rod assembly 1 and the valve port sealing portion 2111 of the valve seat assembly 2 are in contact and pressed tightly. The washer portion 13 provided on the screw rod 151 abuts against the upper surface of the matching portion 121 of the valve needle sleeve 12, and the valve needle 11 is loaded by the elastic force generated by the spring 14 that is further compressed. The electronic expansion valve is in a fully closed state, the screw rod 151 is at the lowest end position of its stroke, and the downward stroke of the screw rod 151 from the fully open state to the fully closed state is L+α+D1−D2.

Figure 9:
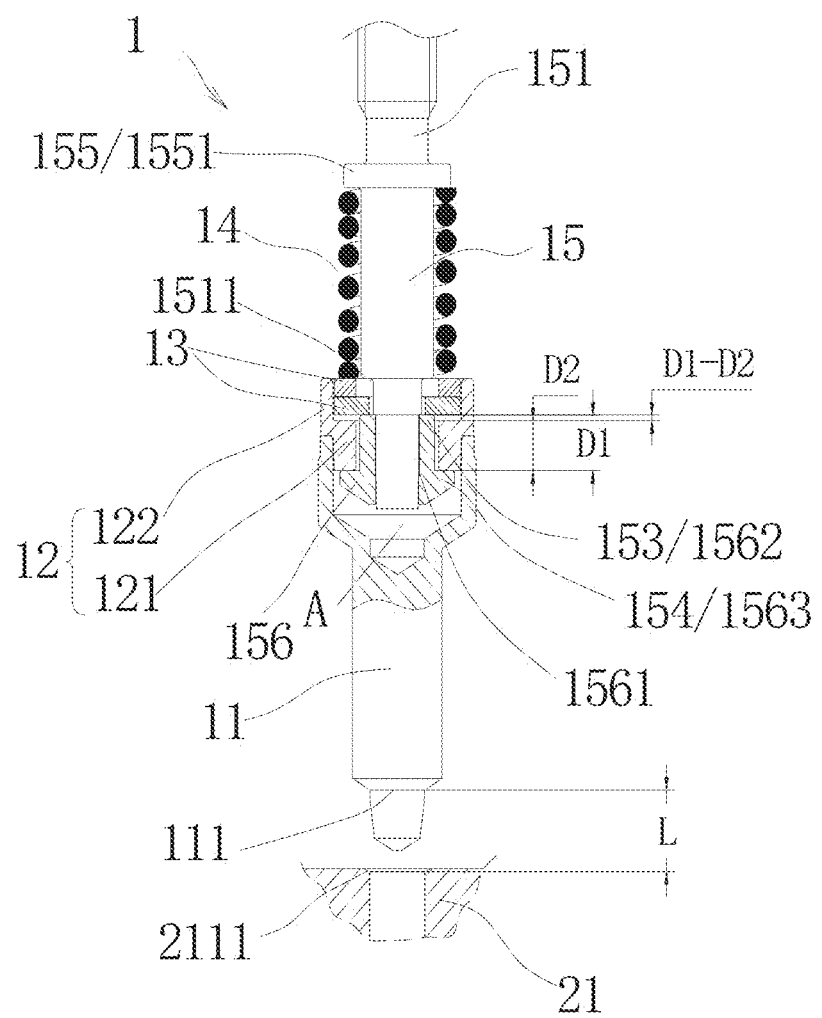
FIG. 9 is a partial cross-sectional view of a second embodiment of the electronic expansion valve provided by the present application in a fully open state.

Reference can be made to FIG. 9. FIG. 9 is a partial cross-sectional view of the second embodiment of the electronic expansion valve provided by the present application in a fully open state.

In order to facilitate the description of this embodiment, the same reference numerals are used for the components in this embodiment and the first embodiment that have the same structure and have the same function. The description of each component in the first embodiment is also applicable to the second embodiment, and the differences from the first embodiment are described in detail below.

In this embodiment, the screw rod assembly 15 includes a lower stop portion 153, and the lower stop portion 153 abuts against the washer portion 13. Specifically, the screw rod assembly 15 includes a bushing part 156. The bushing part 156 includes a connecting hole portion 1561, a body portion 1562, and a suspension engagement portion 1563. The connecting hole portion 1561 may be a through hole or a blind hole, one end of the screw rod 151 and the connecting hole portion 1561 may be fixedly connected by welding, interference fit, or the like.

In the electronic expansion valve provided in this embodiment, the spring 14 is mounted around the screw rod 151, and the upper end of the spring 14 abuts against the upper stop portion 155, and the lower end of the spring 14 abuts against the lower stop portion 153. The cooperation of the spring 14 and the screw rod assembly 15 may relatively reduce the deflection of the spring 14, thereby reducing eccentric wear.

The suspension engagement portion 1563 extends along the circumferential direction of the body portion 1562, and the outer diameter of the suspension engagement portion 1563 is larger than the outer diameter of the body portion 1562. In this embodiment, the valve needle support portion 154 is the suspension engagement portion 1563, and the outer diameter of the suspension engagement portion 1563 is larger than the inner diameter of the matching portion 121. Therefore, the suspension engagement portion 1563 may abut against the matching portion 121 of the valve needle sleeve 12.

In addition, unlike the first embodiment, the lower stop portion 153 in this embodiment is no longer a lower flange portion 1531. The lower stop portion 153 is the body portion 1562 of the bushing part 156. That is, in this embodiment, the body portion 1562 and the washer portion 13 may abut against each other.

It is worth noting that the "may" mentioned in the present application refers to a specific state, but does not mean that the electronic expansion valve is in all working states. For example, in this embodiment, the body portion 1562 may abut against the washer portion 13, which means that the valve port 211 is fully opened or the like.

Of course, at this time, the distance D1 between the suspension engagement portion 1563 and the first retaining ring and the distance D2 between the suspension engagement portion 1563 and the upper end of the matching portion 121 still satisfy D1≥D2.

Figure 10:
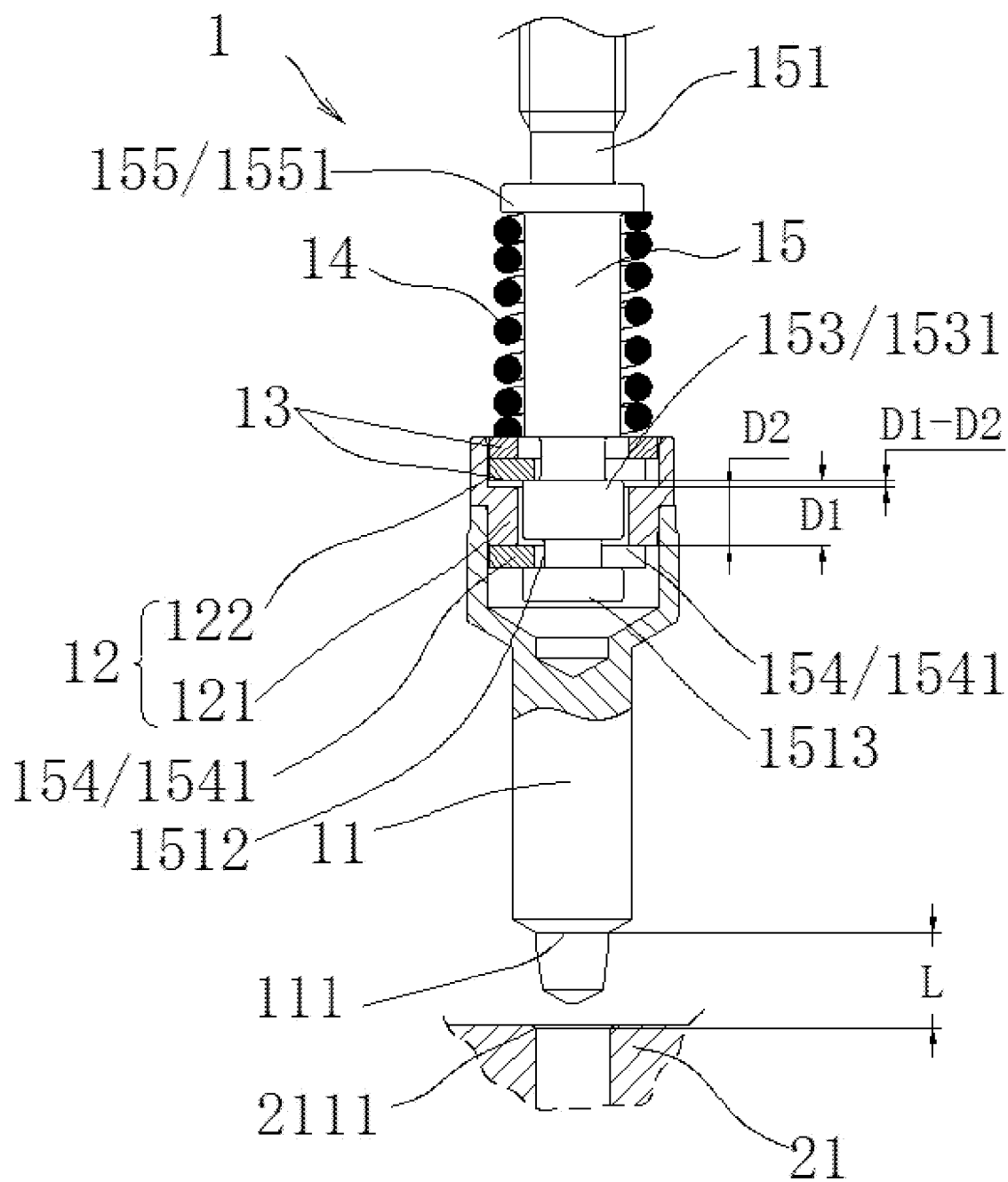
FIG. 10 is a partial cross-sectional view of a third embodiment of the electronic expansion valve provided by the present application in a fully open state.

Reference can be made to FIG. 10. FIG. 10 is a partial cross-sectional view of the third embodiment of the electronic expansion valve provided by the present application in a fully open state.

In order to facilitate the description of this embodiment, the same reference numerals are used for the components in this embodiment and the first embodiment that have the same structure and have the same function. The description of each component in the first embodiment is also applicable to the third embodiment, and the differences from the first embodiment are described in detail below.

In this embodiment, the screw rod assembly 15 includes a valve needle support portion 154, and the upper surface of the valve needle support portion 154 may abut against the matching portion 121 of the valve needle sleeve 12. Specifically, the screw assembly 15 includes a valve needle support washer 1541. In addition, a valve needle support groove portion 1512 and a valve needle support flange portion 1513 are also provided on the screw rod 151. The valve needle support groove portion 1512 is formed by the recessing of the surface of the screw rod 151. Thus, the valve needle support flange portion 1513 located below the valve needle support groove portion 1512 protrudes relative to the circumferential direction of the valve needle support groove portion 1512. The valve needle support washer 1541 is assembled in the valve needle support groove portion 1512. Specifically, the valve needle support washer 1541 and the valve needle support groove portion 1512 are fixedly connected, or connected with the position thereof being limited.

It is worth noting that the molding method of the valve needle support flange portion 1513 may also adopt other forms. For example, the screw rod 151 is not provided with the valve needle support groove portion 1512. The valve needle support flange portion 1513 may be formed by a position towards the lower end of the screw rod 151 extending in the circumferential direction of its surface. At this time, the valve needle support flange portion 1513 may still abut against the valve needle support washer 1541.

In the electronic expansion valve provided in this embodiment, the spring 14 is mounted around the screw rod 151, and the upper end of the spring 14 abuts against the upper stop portion 155, and the lower end of the spring 14 abuts against a lower stop portion 153. The cooperation of the spring 14 and the screw rod assembly 15 may relatively reduce the deflection of the spring 14, thereby reducing eccentric wear.

At this time, the valve needle support portion 154 is a valve needle support washer 1541, and the upper surface of the valve needle support washer 1541 may abut against the matching portion 121 of the valve needle sleeve 12. When the valve port 211 is opened or the like, the valve needle 11 may be supported by the valve needle support washer 1541 via the valve needle sleeve 12 fixedly connected to it.

The difference from the first embodiment is that in this embodiment, the valve needle support portion 154 is no longer a suspension engagement portion 1563, and the valve needle support portion 154 is a valve needle support washer 1541. That is to say, in this embodiment, the matching portion 121 and the valve needle support washer 1541 may abut against each other.

It is worth noting that the "may" mentioned in the present application refers to a specific state, but does not mean that the electronic expansion valve is in all states. For example, in this embodiment, the matching portion 121 and the valve needle support washer 1541 may abut against each other, which means that the valve port 211 is fully opened or the like.

Of course, at this time, the distance D1 between the valve needle support washer 1541 and the first retaining ring and the distance D2 between the valve needle support washer 1541 and the upper end of the matching portion 121 still satisfy D1≥D2.

In order to further reduce the rotational friction resistance of the matching portion 121 relative to the screw rod 151, a coating with lubricating and wear-resistant functions may be sprayed or plated on the surface of the valve needle support washer 1541 (for example, a coating containing polytetrafluoroethylene, graphite or molybdenum disulfide), so as to prolong the service life of the electronic expansion valve.

Figure 11:
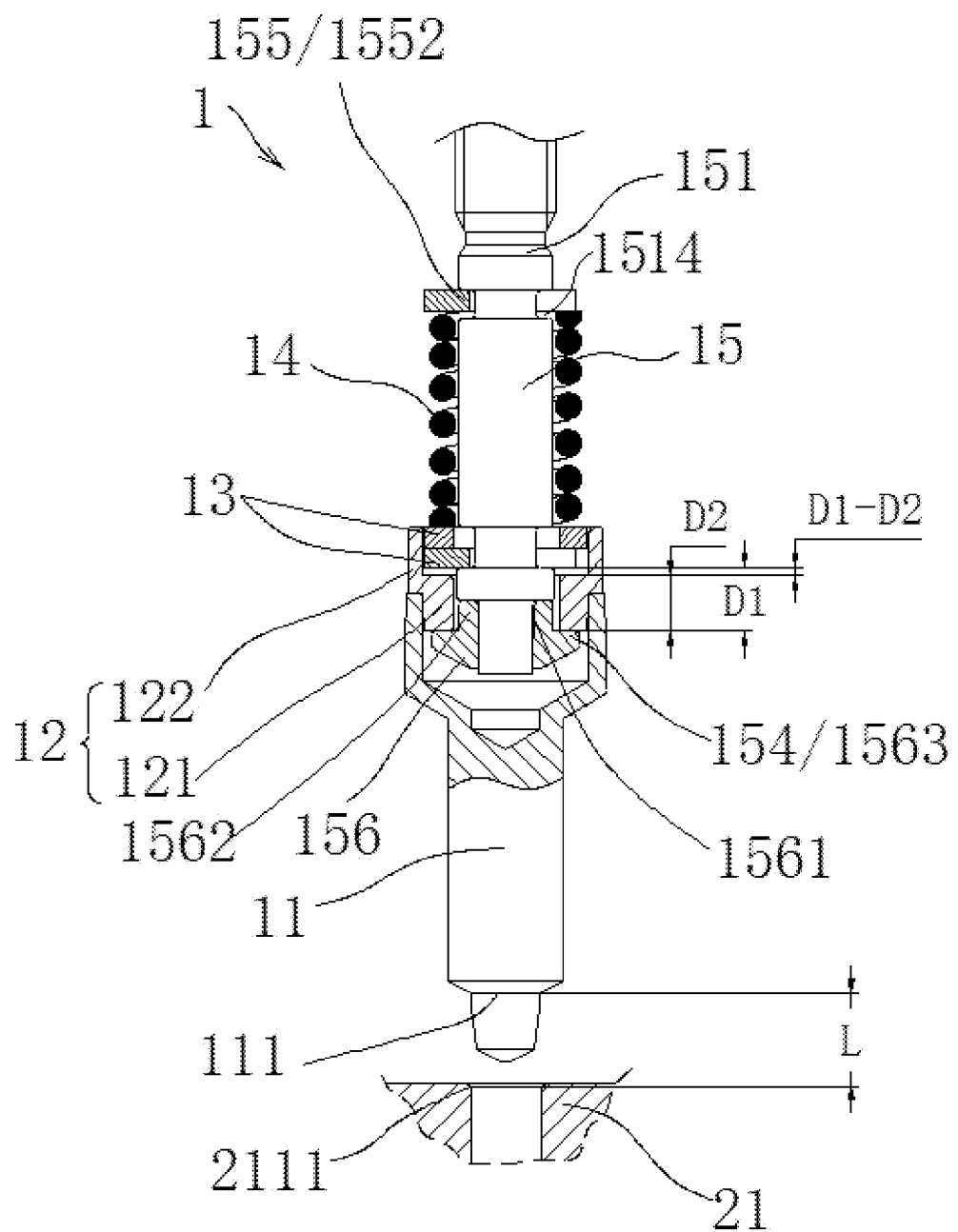
FIG. 11 is a partial cross-sectional view of a fourth embodiment of the electronic expansion valve provided by the present application in a fully open state.

Reference can be made to FIG. 11. FIG. 11 is a partial cross-sectional view of the fourth embodiment of the electronic expansion valve provided by the present application in a fully open state.

In order to facilitate the description of this embodiment, the same reference numerals are used for the components in this embodiment and the first embodiment that have the same structure and have the same function. The description of each component in the first embodiment is also applicable to the fourth embodiment, and the differences from the first embodiment are described in detail below.

In this embodiment, the screw rod assembly 15 includes an upper stop portion 155, and the upper stop portion 155 abuts against the spring 14. Specifically, in this embodiment, the screw rod assembly 15 is equipped with an upper retaining ring 1552. In addition, the screw rod 151 is further provided with an annular groove 1514 above the spring. The annular groove 1514 above the spring is formed by the recessing of the surface of the screw rod 151. The upper retaining ring 1552 is assembled in the annular groove 1514 above the spring. Specifically, the upper retaining ring 1552 is fixedly connected, or connected with the annular groove 1514 above the spring with the position thereof is limited, that is, it is clamped into the annular groove 1514 above the spring for being limited. It is also possible to provide the upper flange portion 1551 and the upper retaining ring 1552 at the same time. The spring 14 directly abuts the upper retaining ring 1552. The spring 14 abuts against the upper flange portion 1551 indirectly.

The difference from the first embodiment is that in this embodiment, the upper stop portion 155 is no longer an upper flange portion 1551, and the upper stop portion 155 is an upper retaining ring 1552. That is, in this embodiment, the upper retaining ring 1552 abuts against the spring 14.

At this time, the spring 14 is sleeved on the shaft of the screw rod 151, and the upper end of the spring 14 abuts against the lower end surface of the upper retaining ring 1552. It is worth noting that the present application does not limit the number of retaining rings in the upper retaining ring 1552. Specifically, the upper retaining ring 1552 provided on the annular groove 1514 above the spring of the screw rod 151 may be composed of an open retaining ring, or one or more retaining rings may be added on the lower side of the open retaining ring.

Of course, at this time, the distance between the suspension engagement portion 1563 and the lower flange portion 1531 is D1, The distance between the suspension engagement portion 1563 and the upper end of the matching portion 121 is D2, which still satisfies D1≥D2.

In this embodiment, when the valve needle 11 and the screw rod 151 rotate relative to each other, the rotating friction surface may also occur between the upper end of the spring 14 and the upper retaining ring 1552. In order to further reduce the frictional resistance of its relative rotation, a coating with lubricating and wear-resisting functions may be sprayed or plated on the surface of the upper retaining ring 1552 (for example, a coating containing polytetrafluoroethylene, or containing graphite, or containing molybdenum disulfide), thereby increasing the service life of the electronic expansion valve.

Figure 12:
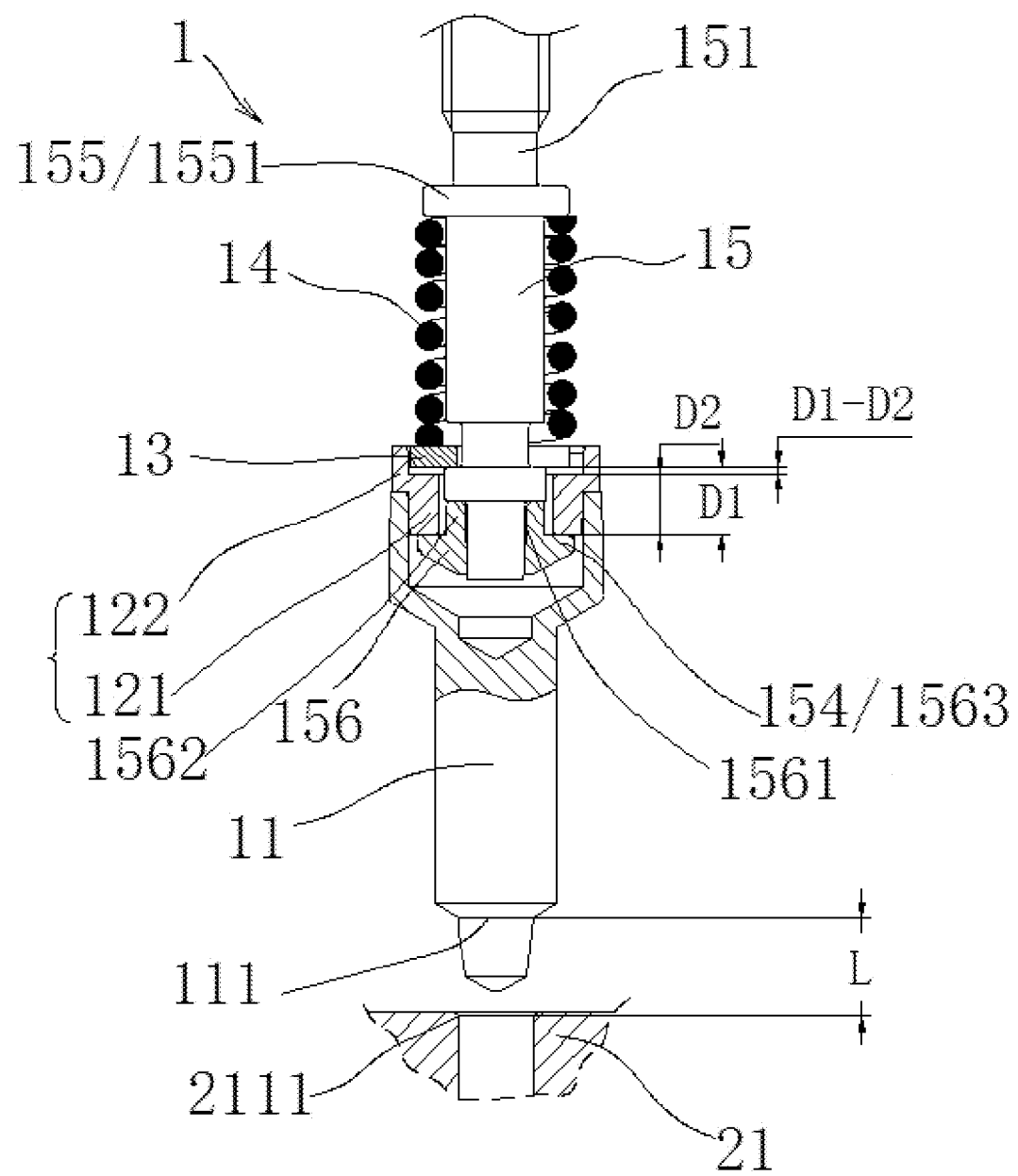
FIG. 12 is a partial cross-sectional view of a fifth embodiment of the electronic expansion valve provided by the present application in a fully open state.

Reference can be made to FIG. 12. FIG. 12 is a partial cross-sectional view of the fifth embodiment of the electronic expansion valve provided by the present application in a fully open state.

In order to facilitate the description of this embodiment, the same reference numerals are used for the components in this embodiment and the first embodiment that have the same structure and have the same function. The description of each component in the first embodiment is also applicable to the fifth embodiment, and the differences from the first embodiment are described in detail below.

The difference from the first embodiment is that in this embodiment, the number of the washer portion 13 is one. This embodiment illustrates that in the present application, the number of washers in the washer portion 13 is not limited.

Of course, at this time, the distance between the suspension engagement portion 1563 and the washer portion 13 is D1, and the distance between the suspension engagement portion 1563 and the upper end of the matching portion 121 is D2, which still satisfies D1≥D2.

Figure 13:
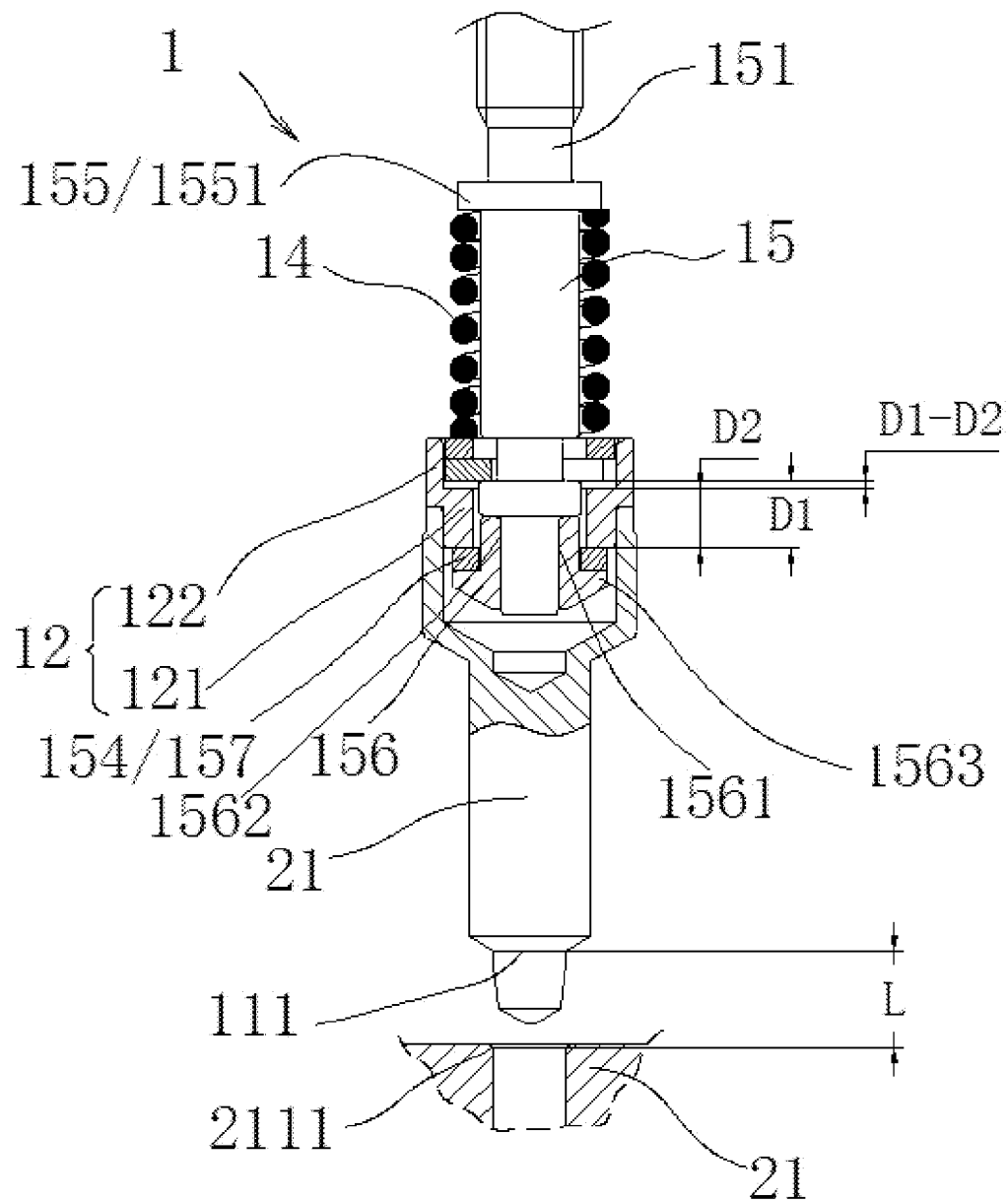
FIG. 13 is a partial cross-sectional view of a sixth embodiment of the electronic expansion valve provided by the present application in a fully open state.

Reference can be made to FIG. 13. FIG. 13 is a partial cross-sectional view of the sixth embodiment of the electronic expansion valve provided by the present application in a fully open state.

In order to facilitate the description of this embodiment, the same reference numerals are used for the components in this embodiment and the first embodiment that have the same structure and have the same function. The description of each component in the first embodiment is also applicable to the sixth embodiment, and the differences from the first embodiment are described in detail below.

In this embodiment, a sleeve washer 157 is added between the bushing part 156 and the valve needle sleeve 12. When the valve needle 11 is not subjected to the elastic load generated by the spring 14, the valve needle 11 and the valve needle sleeve 12 are suspended on the suspension engagement portion 1563 of the bushing part 156 with a sleeve washer 157 spaced apart.

At this time, the valve needle support portion 154 is a sleeve washer 157, and the upper surface of the sleeve washer 157 and the lower surface of the matching portion 121 of the valve needle sleeve 12 may abut against each other.

This embodiment illustrates that: in the present application, the upper end of the suspension engagement portion 1563 may abut against the matching portion 121 of the valve needle sleeve 12, and it is not limited to the direct abutment between the upper end of the suspension engagement portion 1563 and the matching portion 121 of the valve needle sleeve 12, but also includes the indirect abutment between the upper end of the suspension engagement portion 1563 and the matching portion 121 of the valve needle sleeve 12.

Of course, at this time, the distance between the sleeve washer 157 and the washer portion 13 is D1, the distance between the sleeve washer 157 and the upper end of the matching portion 121 is D2, which still satisfies D1≥D2.

Figure 14:
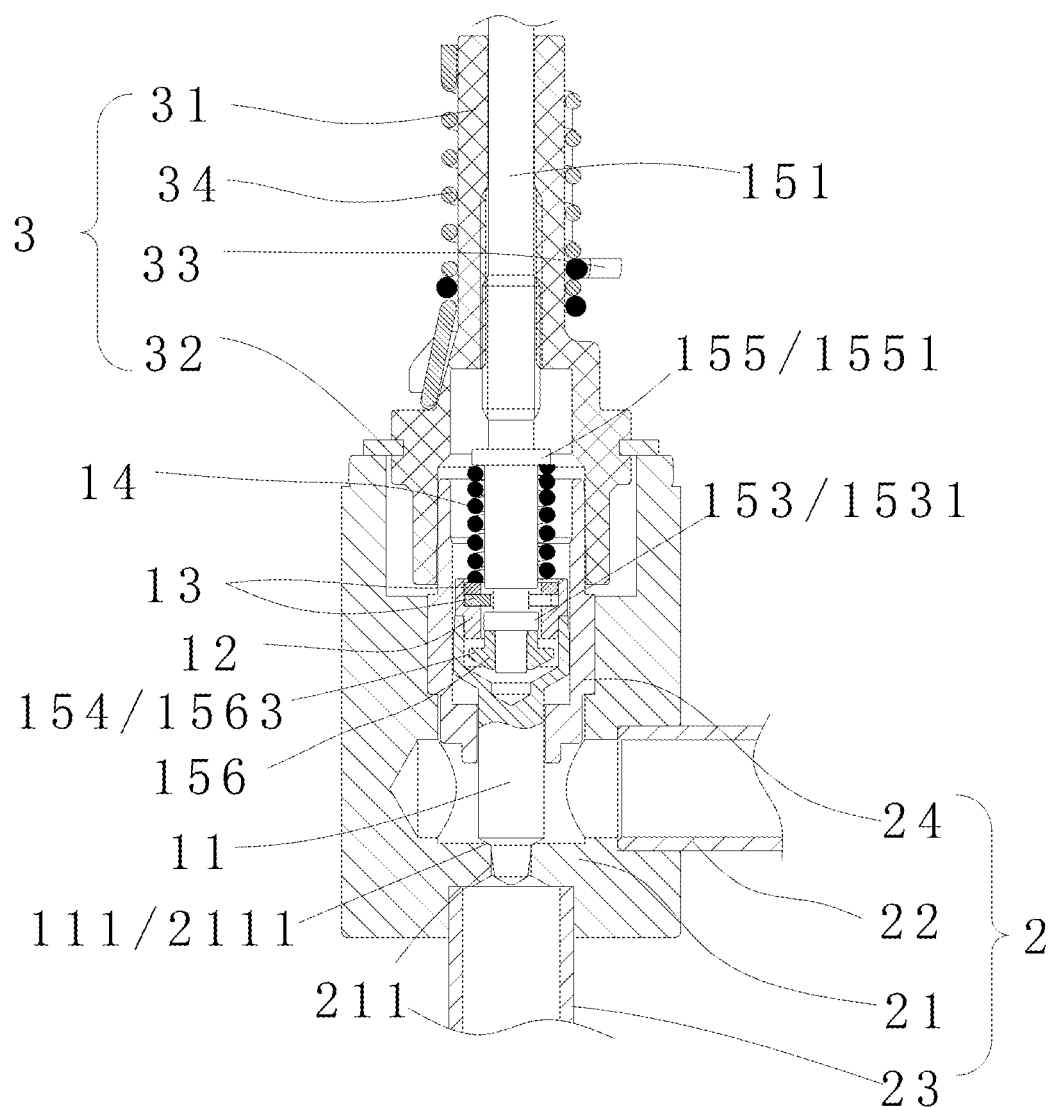
FIG. 14 is a partial cross-sectional view of a seventh embodiment of the electronic expansion valve provided by the present application in a fully open state.

Reference can be made to FIG. 14. FIG. 14 is a partial cross-sectional view of the seventh embodiment of the electronic expansion valve provided by the present application in a fully open state;

It should be pointed out that the main object of the present application is to improve the valve needle screw rod assembly 1 of the electronic expansion valve. For other parts of the electronic expansion valve, such as the magnetic rotor assembly, the nut assembly 3, the stop device, etc., general technology may be used, and other electronic expansion valve structures that may achieve the same function may also be used.

In order to facilitate the description of this embodiment, the same reference numerals are used for the components in this embodiment and the first embodiment that have the same structure and have the same function. The description of each component in the first embodiment is also applicable to the seventh embodiment, and the differences from the first embodiment are described in detail below.

For example, in this embodiment, the structure of the valve seat assembly 2 is slightly different. The valve seat assembly includes the valve seat 21, the first connecting pipe portion 22, the second connecting pipe portion 23, and the guide seat 24. The nut assembly 3 in this embodiment is fixedly connected to the upper side of the valve seat assembly 2 (specifically connected to the upper side of the valve seat 21) through the nut connection portion 32, and the fixed connection method may preferably be a welding fixed connection.

In this embodiment, the guide seat 24 cooperates with the valve needle screw rod assembly 1, and the guide seat 24 has a guiding function for the valve needle screw rod assembly 1.

Figure 15:
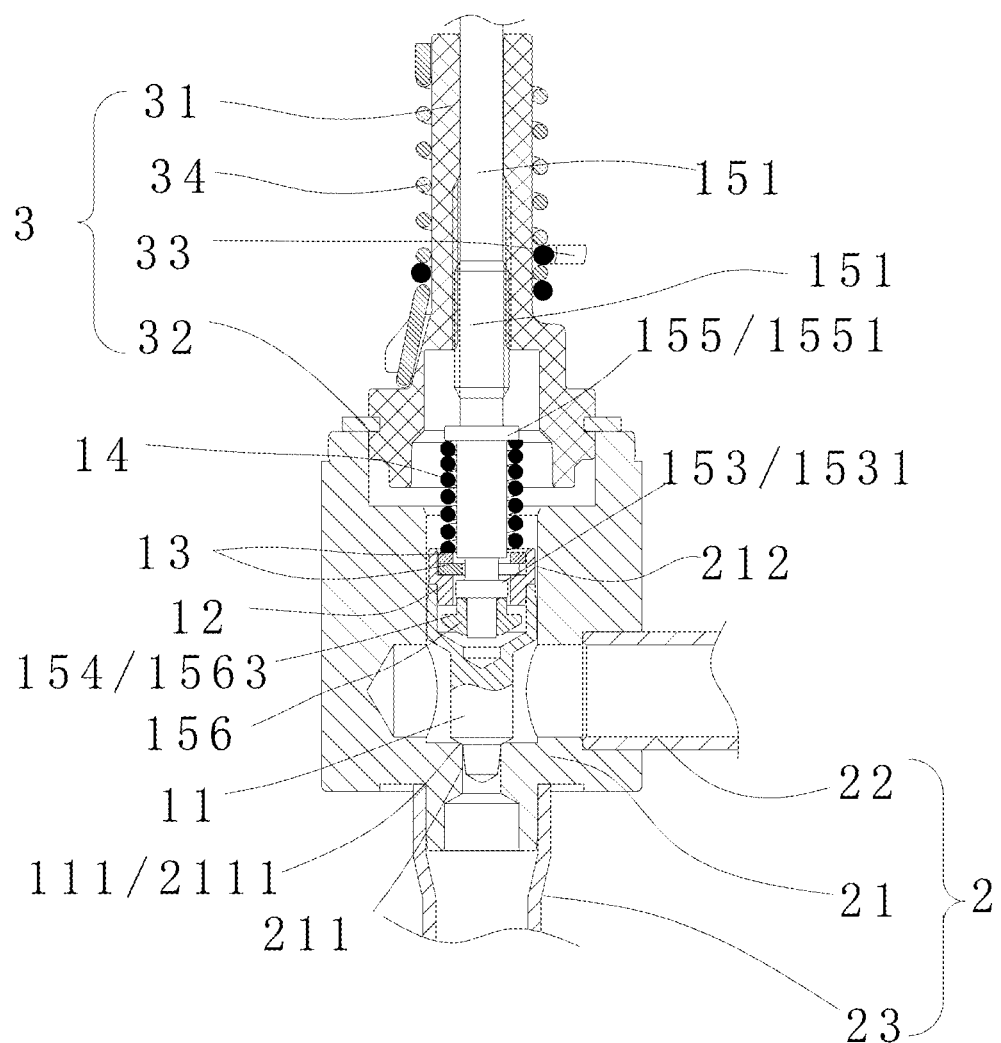
FIG. 15 is a partial cross-sectional view of a eighth embodiment of the electronic expansion valve provided by the present application in a fully open state.

Referring to FIG. 15, FIG. 15 is a partial cross-sectional view of the eighth embodiment of the electronic expansion valve provided by the present application in a fully open state;

In order to facilitate the description of this embodiment, the same reference numerals are used for the components in this embodiment and the first embodiment that have the same structure and have the same function. The description of each component in the first embodiment is also applicable to the eighth embodiment, and the differences from the first embodiment are described in detail below.

In this embodiment, the valve seat assembly 2 includes the valve seat 21, the first connecting pipe portion 22 and the second connecting pipe portion 23. The center inner hole of the valve seat 21 of the valve seat assembly 2 is provided with an inner hole guide portion 212 that matches with the valve needle screw rod assembly 1. When the electronic expansion valve is opening and closing, the inner hole guide portion 212 of the valve seat 21 provides a guiding function for the valve needle screw rod assembly 1. Specifically, the inner hole guide portion 212 of the valve seat 21 cooperates with the outer edge of the valve needle 11 and/or the peripheral wall portion 122 of the valve needle sleeve 12 to provide guidance for the valve needle screw rod assembly 1.

Figure 16:
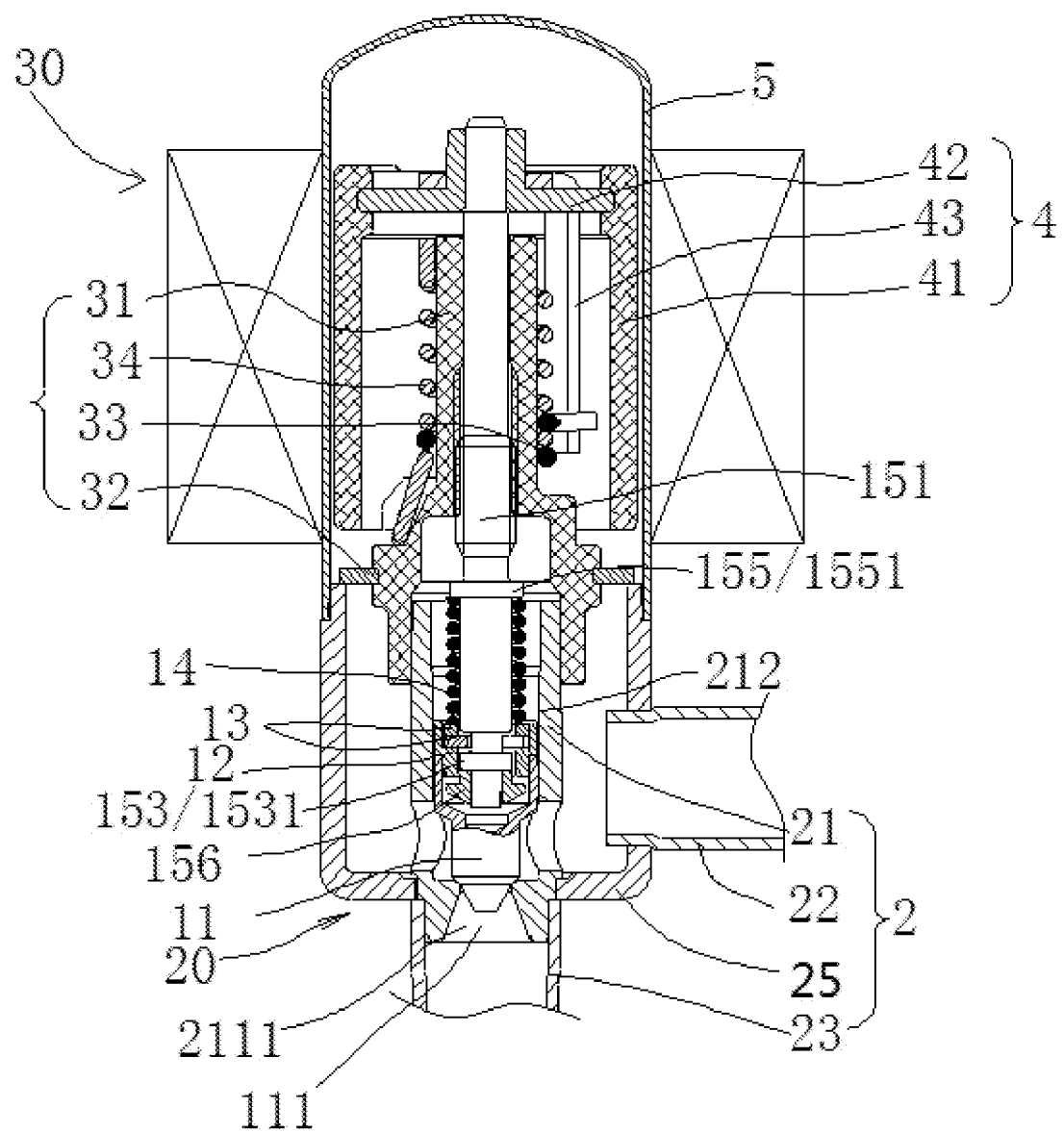
FIG. 16 is a partial cross-sectional view of a ninth embodiment of the electronic expansion valve provided by the present application in a fully open state.

Please refer specifically to FIG. 16, FIG. 16 is a partial cross-sectional view of the ninth embodiment of the electronic expansion valve provided by the present application in a fully open state;

In order to facilitate the description of this embodiment, the same reference numerals are used for the components in this embodiment and the first embodiment that have the same structure and have the same function. The description of each component in the first embodiment is also applicable to the ninth embodiment, and the differences from the first embodiment are described in detail below.

In this embodiment, the valve seat assembly 2 includes the valve seat 21, the first connecting pipe portion 22, the second connecting pipe portion 23, and the connecting seat 25. The first connecting pipe portion 22 is fixedly connected to the connecting seat 25, and the second connecting pipe portion 23 is fixedly connected to the valve seat 21. The inner hole guide portion 212 in this embodiment is provided on an inner hole wall on the upper side of the valve port 211 of the valve seat 21. The inner hole guide portion 212 of the valve seat assembly 2 provides a guiding function for the valve needle screw rod assembly 1. When the electronic expansion valve is opened or closed, the valve needle screw rod assembly 1 cooperates with the inner hole guide portion 212 of the valve seat assembly to realize the guiding and correcting function of the valve needle portion. Specifically, the inner hole guide portion 212 of the valve seat 21 cooperates with the outer edge of the valve needle 11 and/or the peripheral wall portion 122 of the valve needle sleeve 12 to provide guidance for the valve needle screw rod assembly 1.

In the electronic expansion valve provided in this embodiment, the spring 14 is mounted around the screw rod 151, and the upper end of the spring 14 abuts against the upper stop portion 155, and the lower end of the spring 14 abuts against the lower stop portion 153. The cooperation of the spring 14 and the screw rod assembly 15 may relatively reduce the deflection of the spring 14, thereby reducing eccentric wear.

It should be noted that the orientation terms such as up, down, left, right mentioned in the embodiment are all introduced for the convenience of description based on the drawings in the description; and the ordinal terms such as "first" and "second" in the component name are also introduced for the convenience of description, and do not mean to make any restriction on any order of the components.

The electronic expansion valve according to the present application is described in detail hereinbefore. The principle and the embodiments of the present application are illustrated herein by specific examples. The above description of examples is only intended to help the understanding of the idea of the present application. It should be noted that, for the person skilled in the art, many modifications and improvements may be made to the present application without departing from the principle of the present application, and these modifications and improvements are also deemed to fall into the protection scope of the present application defined by the claims.

What is claimed is:

1. An electronic expansion valve, comprising a valve needle screw rod assembly, wherein the valve needle screw rod assembly comprises a washer portion, a spring and a screw rod assembly, the screw rod assembly comprises a screw rod, and the spring is mounted around the screw rod;
   the screw rod assembly comprises a lower stop portion and an upper stop portion, the lower stop portion is abutable against the washer portion;
   the upper stop portion abuts against the spring;
   the lower end of the spring abuts against the washer portion,
   wherein the valve needle screw rod assembly further comprises a valve needle and a valve needle sleeve; the valve needle is fixedly connected to the valve needle sleeve, the valve needle sleeve comprises a peripheral wall portion and a matching portion, the washer portion is located at the peripheral wall portion, an inner diameter of the matching portion is smaller than an inner diameter of the peripheral wall portion,
   wherein the valve needle and the valve needle sleeve, which are fixedly connected, are connected with the screw rod assembly with the positions of the valve needle and the valve needle sleeve being limited, and wherein the valve needle sleeve and the screw rod are rotatable relative to each other.

2. The electronic expansion valve according to claim 1, wherein the lower stop portion comprises a lower flange portion, the lower flange portion extends along a circumferential direction of the screw rod, the lower stop portion and the screw rod are integrally formed or fixedly connected, the lower stop portion is abutable against the washer portion.

3. The electronic expansion valve according to claim 2, wherein the screw rod assembly comprises a valve needle support portion, the valve needle support portion comprises a valve needle support washer and a valve needle support groove portion, the valve needle support washer is fixedly connected with the valve needle support groove portion, or is connected with the valve needle support groove portion with a position of the valve needle support washer being limited, the valve needle support washer is abutable against the matching portion of the valve needle sleeve.

4. The electronic expansion valve according to claim 1, wherein the screw rod assembly comprises a bushing part, the bushing part comprises a connecting hole portion for allowing the screw rod to be inserted, a body portion, and a suspension engagement portion, and the lower stop portion is the body portion, the body portion is abutable against the washer portion, the suspension engagement portion extends along a circumferential direction of the body portion.

5. The electronic expansion valve according to claim 4, wherein the screw rod assembly comprises a valve needle support portion, the valve needle support portion comprises a suspension engagement portion, the suspension engagement portion is abutable against the matching portion of the valve needle sleeve.

6. The electronic expansion valve according to claim 4, wherein the screw rod assembly comprises a valve needle support portion, the valve needle support portion comprises a sleeve washer, the sleeve washer is supported by the suspension engagement portion, the sleeve washer is abutable against the matching portion of the valve needle sleeve.

7. The electronic expansion valve according to claim 1, wherein the upper stop portion comprises an upper flange portion, the upper flange portion extends along a circumferential direction of the screw rod, the upper flange portion and the screw rod are integrally formed or fixedly connected, the spring abuts against the upper flange portion.

8. The electronic expansion valve according to claim 1, wherein the upper stop portion comprises an upper retaining ring, the screw rod comprises an annular groove above the spring; the annular groove above the spring is connected with the upper retaining ring with a position of the annular groove above the spring being limited, or is fixedly connected with the upper retaining ring, the spring abuts against the upper retaining ring.

9. The electronic expansion valve according to claim 1, wherein the upper stop portion comprises an upper flange portion and an upper retaining ring, the upper flange portion extends along a circumferential direction of the screw rod, the upper flange portion and the screw rod are integrally formed or fixedly connected, the upper retaining ring is located between the spring and the upper flange portion, the spring directly abuts against the upper retaining ring, the spring indirectly abuts against the upper flange portion.

10. The electronic expansion valve according to claim 1, wherein a distance between the lower stop portion and the washer portion is D1, a distance between the lower stop portion and the upper end of the matching portion is D2, and D1≥D2.

* * * * *